US011023275B2

(12) United States Patent
Dinan et al.

(10) Patent No.: US 11,023,275 B2
(45) Date of Patent: Jun. 1, 2021

(54) TECHNOLOGIES FOR QUEUE MANAGEMENT BY A HOST FABRIC INTERFACE

(71) Applicant: Intel Corporation, Santa Clara, CA (US)

(72) Inventors: James Dinan, Hudson, MA (US);
Mario Flajslik, Hudson, MA (US);
Timo Schneider, Hudson, MA (US)

(73) Assignee: Intel Corporation, Santa Clara, CA (US)

(*) Notice: Subject to any disclaimer, the term of this patent is extended or adjusted under 35 U.S.C. 154(b) by 914 days.

(21) Appl. No.: 15/428,282

(22) Filed: Feb. 9, 2017

(65) Prior Publication Data

US 2018/0225144 A1    Aug. 9, 2018

(51) Int. Cl.
*G06F 9/46* (2006.01)
*G06F 9/48* (2006.01)
*G06F 9/50* (2006.01)

(52) U.S. Cl.
CPC .............. *G06F 9/4881* (2013.01); *G06F 9/46* (2013.01); *G06F 9/5016* (2013.01)

(58) Field of Classification Search
CPC ......... G06F 9/46; G06F 9/4881; G06F 9/5016
See application file for complete search history.

(56) References Cited

U.S. PATENT DOCUMENTS 5,649,092 A * 7/1997 Price ..................... G06F 11/203
714/15

8,219,794 B1 * 7/2012 Wang ..................... G06F 3/0607
713/2
2010/0125748 A1 * 5/2010 Chen .................... G06F 11/2005
714/4.4

OTHER PUBLICATIONS

Keppel et al., U.S. Appl. No. 15/087,536, filed Mar. 31, 2016.
James Dinan, D. Brian Larkins, P. Sadayappan, Sriram Krishnamoorthy, Jarek Nieplocha, "Scalable Work Stealing." Proc. Conf. on HPC Networking, Storage, and Analysis (SC). Nov. 2009.
H. Subramoni , G. Marsh , S. Narravula , P. Lai , and D. K. Panda, "Design and Evaluation of Benchmarks for Financial Applications using Advanced Message Queuing Protocol (AMQP) over InfiniBand." Proc. Workshop on High Performance Computational Finance (in conjunction with SC '08), Nov. 2008.
B.W. Barrett et al., "The portals 4.0.2 network programming interface", Sandia National Laboratories Oct. 2014 Technical Report SAND2014-19568.
Schneider, Timo, et al. "Protocols for fully offloaded collective operations on accelerated network adapters." 2013 42nd International Conference on Parallel Processing. IEEE, 2013.

* cited by examiner

*Primary Examiner* — Camquy Truong
(74) *Attorney, Agent, or Firm* — Compass IP Law PC (57) ABSTRACT

Technologies for managing a queue on a compute device are disclosed. In the illustrative embodiment, the queue is managed by a host fabric interface of the compute device. Queue operations such as enqueuing data onto the queue and dequeuing data from the queue may be requested by remote compute devices by sending queue operations which may be processed by the host fabric interface. The host fabric interface may, in some embodiments, fully manage the queue without any assistance from the processor of the compute device. In other embodiments, the processor of the compute device may be responsible for certain tasks, such as garbage collection.

24 Claims, 6 Drawing Sheets

TECHNOLOGIES FOR QUEUE MANAGEMENT BY A HOST FABRIC INTERFACE

GOVERNMENT RIGHTS CLAUSE

This invention was made with Government support under contract number H98230A-13-D-0124 awarded by the Department of Defense. The Government has certain rights in this invention.

Application Ser. No. 15/234,773, filed 11 Aug. 2016, now U.S. Pat. No. 10/249,017 and titled "APPARATUS AND METHOD FOR SHARED RESOURCE PARTITIONING THROUGH CREDIT MANAGEMENT", which is incorporated by reference in its entirety for all purposes.

BACKGROUND

Hosting a queue on a local compute device that can be accessed by remote compute devices has several useful applications in some environments, such as for certain parallel processing tasks in a data center. The queue may be managed by the local compute device, but the local compute device may be required to devote significant resources to manage the queue.

An alternative to managing the queue at the local compute device is to allow remote compute devices to directly access the memory in the local compute device that is associated with the queue and allow the remote compute device to perform some queue management tasks. However, such an approach may require several rounds of communication in order to ensure that no conflicts arise, such as two compute devices trying to dequeue the same queue element.

BRIEF DESCRIPTION OF THE DRAWINGS

The concepts described herein are illustrated by way of example and not by way of limitation in the accompanying figures. For simplicity and clarity of illustration, elements illustrated in the figures are not necessarily drawn to scale. Where considered appropriate, reference labels have been repeated among the figures to indicate corresponding or analogous elements.

DETAILED DESCRIPTION OF THE DRAWINGS

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C): (A and B); (B and C); (A and C); or (A, B, and C). Similarly, items listed in the form of "at least one of A, B, or C" can mean (A); (B); (C): (A and B); (B and C); (A and C); or (A, B, and C).

The disclosed embodiments may be implemented, in some cases, in hardware, firmware, software, or any combination thereof. The disclosed embodiments may also be implemented as instructions carried by or stored on one or more transitory or non-transitory machine-readable (e.g., computer-readable) storage medium, which may be read and executed by one or more processors. A machine-readable storage medium may be embodied as any storage device, mechanism, or other physical structure for storing or transmitting information in a form readable by a machine (e.g., a volatile or non-volatile memory, a media disc, or other media device).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

Figure 1:
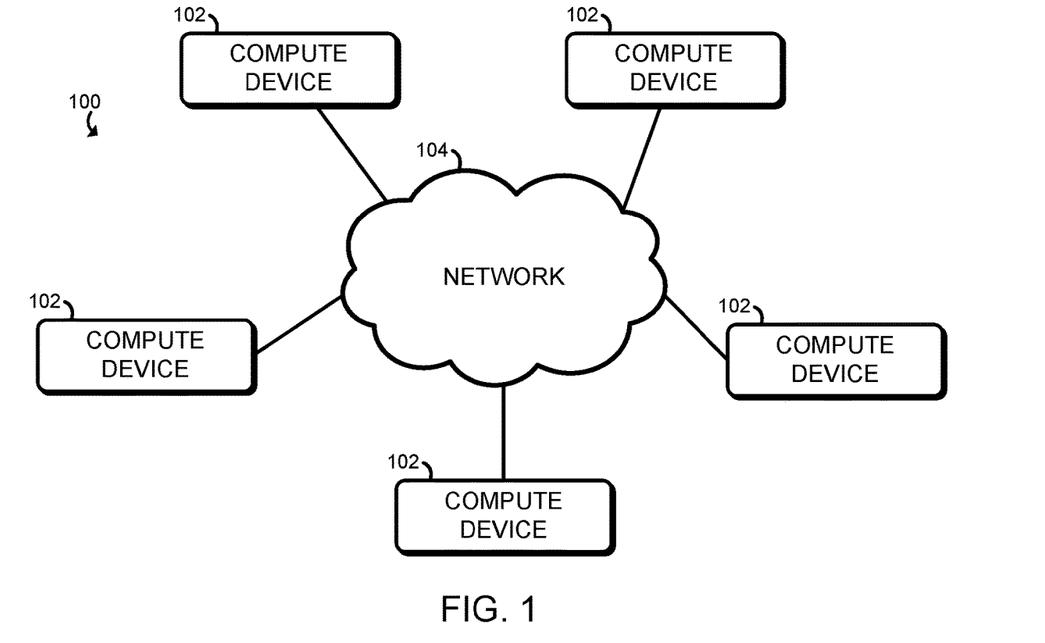
FIG. 1 is a simplified block diagram of at least one embodiment of a network for accessing a queue hosted on a compute device by a remote compute device.

Referring now to FIG. 1, a system 100 includes several compute devices 102 which are connected by an illustrative network 104. One of the compute devices 102 hosts a queue that may be accessed by other compute device 102 on the network 104. The queue is a first in, first out data structure, and queue element data may be enqueued or "pushed" onto the beginning of the queue or may be dequeued or "popped" off the end of the queue. In use, a remote compute device 102 (or the local compute device 102 itself) may send a message including a queue operation to the local compute device 102 hosting the queue. The local compute device 102 may process the queue operation directly at a host fabric interface 210, such as through operations which directly access memory 204 of the compute device 102 hosting the queue. Such an approach may, in some embodiments, provide the advantage of not requiring the processor 202 to perform any queue management tasks as well as not requiring several rounds of communication between the remote compute device 102 and the local compute device 102.

In some embodiments, the host fabric interface 210 may maintain two linked lists associated with the queue. A first linked list is embodied as a free list, which includes a list element for each free memory location of the memory allocated in the memory 204 for the queue. A second linked list is embodied as a queue list, which includes a list element for each element in the queue at any given time. When a queue operation is received, the first element from the appropriate list is selected (i.e., the first element from the free list for an enqueue operation, and the first element from the queue list for a dequeue operation). The queue operation is performed, and then the selected list element may be automatically appended to the other list using triggered operations, as discussed in more detail below. For example, if the queue operation is an enqueue operation, the first list element of the free list is removed from the free list, the queue element data is stored in the corresponding memory location, and then the first list element is added to the queue list.

In other embodiments, the host fabric interface 210 may maintain a single linked list associated with the queue. In such embodiments, each memory location for storing a queue element is associated with two list elements, a free list element and a queue list element. Only one of the list elements for each memory location may be in the list at any given time depending on whether the memory location is free or contains a queue element. For example, if the memory location is free, the corresponding free list element may be in the list, and if the memory location contains a queue element, the corresponding queue list element may be in the list. Some of the elements in the linked list may be free list elements, and some of the elements in the linked list may be queue list elements. The free list elements may be distinguished from the queue list elements through the use of matching bits. In the illustrative embodiment, each free list element has a first value for the matching bits and each queue list element has a second value for the matching bits. In such an embodiment, an incoming queue operation will include a set of matching bits as well, and the host fabric interface 210 will traverse the list in order looking for the first list element that has matching bits that match those of the queue operation. The first matching list element is selected, and the associated memory location is read from or written to, depending on the operation being performed. The other list element corresponding to the same memory location is then appended to the end of the list. For example, if the incoming queue operation is an enqueue, the first free list element is selected, and the queue element data is written to the corresponding memory location. The selected free list element is removed from the list, and the corresponding queue list element that is associated with the same memory location is appended to the end of the queue.

The network 104 may be any type of network connecting the compute devices 102. For example, the system 100 may be a data center and the network 104 may be established through a series of cables and switches connecting the various compute devices 102 of the data center.

Figure 2:
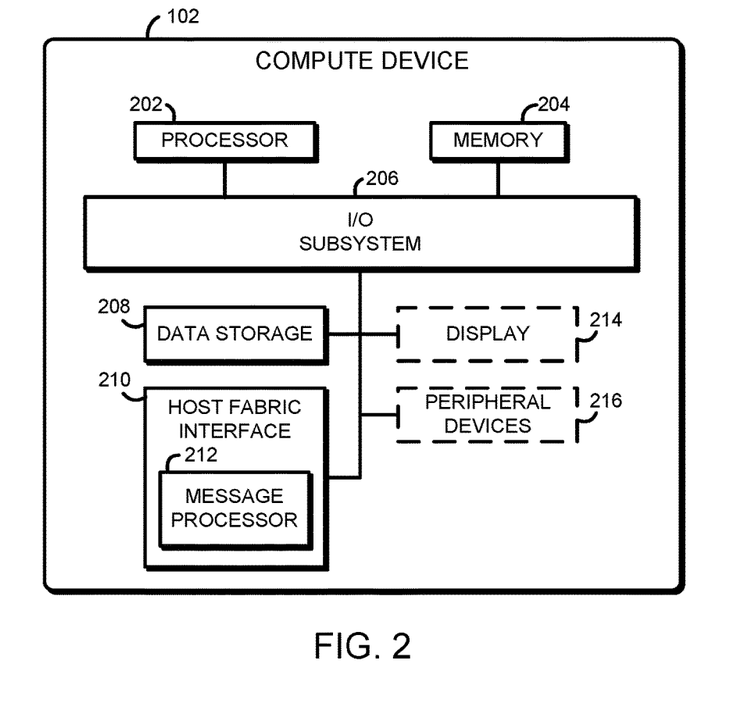
FIG. 2 is a simplified block diagram of at least one embodiment of a compute device of FIG. 1 that may host a queue.

Referring now to FIG. 2, an illustrative compute device 102 may be embodied as any type of compute device capable of performing the functions described herein. For example, the compute device 102 may be embodied as or otherwise be included in, without limitation, a server computer, a desktop computer, a smartphone, a cellular phone, a wearable computer, an embedded computing system, a System-on-a-Chip (SoC), a tablet computer, a notebook computer, a laptop computer, a handset, a messaging device, a camera device, a multiprocessor system, a processor-based system, a consumer electronic device, and/or any other computing device.

The illustrative compute device 102 includes a processor 202, the memory 204, an input/output (I/O) subsystem 206, data storage 208, and a host fabric interface 210. In some embodiments, one or more of the illustrative components of the compute device 102 may be incorporated in, or otherwise form a portion of, another component. For example, the memory 204, or portions thereof, may be incorporated in the processor 202 in some embodiments.

The processor 202 may be embodied as any type of processor capable of performing the functions described herein. For example, the processor 202 may be embodied as a single or multi-core processor(s), a single or multi-socket processor, a digital signal processor, a graphics processor, a microcontroller, or other processor or processing/controlling circuit. Similarly, the memory 204 may be embodied as any type of volatile or non-volatile memory or data storage capable of performing the functions described herein. In operation, the memory 204 may store various data and software used during operation of the compute device 102 such as operating systems, applications, programs, libraries, and drivers. The memory 204 is communicatively coupled to the processor 202 via the I/O subsystem 206, which may be embodied as circuitry and/or components to facilitate input/output operations with the processor 202, the memory 204, and other components of the compute device 102. For example, the I/O subsystem 206 may be embodied as, or otherwise include, memory controller hubs, input/output control hubs, firmware devices, communication links (i.e., point-to-point links, bus links, wires, cables, light guides, printed circuit board traces, etc.) and/or other components and subsystems to facilitate the input/output operations. In some embodiments, the I/O subsystem 206 may form a portion of a system-on-a-chip (SoC) and be incorporated, along with the processor 202, the memory 204, and other components of the compute device 102 on a single integrated circuit chip. In the illustrative embodiment, the memory 204 may be embodied as a main memory of the compute device 102 and may be stored in one or more dual in-line memory modules (DIMMs).

The data storage 208 may be embodied as any type of device or devices configured for the short-term or long-term storage of data. For example, the data storage 208 may include any one or more memory devices and circuits, memory cards, hard disk drives, solid-state drives, or other data storage devices.

The host fabric interface 210 may be embodied as any interface capable of interfacing the compute device 102 with the network 104. The host fabric interface 210 may also be referred to or be embodied as a network interface controller (NIC). The host fabric interface 210 may be capable of interfacing with any appropriate cable type, such as an electrical cable or an optical cable. The host fabric interface 210 may be configured to use any one or more communication technology and associated protocols (e.g., Ethernet, Bluetooth®, Wi-Fi®, WiMAX, near field communication (NFC), etc.). The host fabric interface 210 includes a message processor 212, which is capable of performing certain tasks based on the content of messages received. The host fabric interface 210 and message processor 212 may be capable of performing a particular interface, such as the Portals 4.0 Network Programming Interface, published by Sandia National Labs in November 2012 with designation SAND2012-10087. For example, depending on the particular message received, the host fabric interface 210 may store data received from a remote compute device 102 as part of the message in the memory 204, retrieve data from the memory 204 and send it to the remote compute device 102 which sent the message, trigger certain operations described in more detail below, or implement any other functionality required to implement a particular interface, such as the Portals 4.0 interface. In some embodiments, the host fabric interface 210 may be in a package separate from the processor 202, in a multi-chip package with the processor 202, or in a system-on-a-chip with the processor 202.

Of course, in some embodiments, the compute device 102 may include additional components often found in a compute device 102, such as a display 214 and/or one or more peripheral devices 216. The peripheral devices 216 may include a keyboard, a mouse, a camera, etc.

The display 214 may be embodied as any type of display on which information may be displayed to a user of the compute device 102, such as a liquid crystal display (LCD), a light emitting diode (LED) display, a cathode ray tube (CRT) display, a plasma display, an image projector (e.g., 2D or 3D), a laser projector, a touchscreen display, a heads-up display, and/or other display technology.

Figure 3:
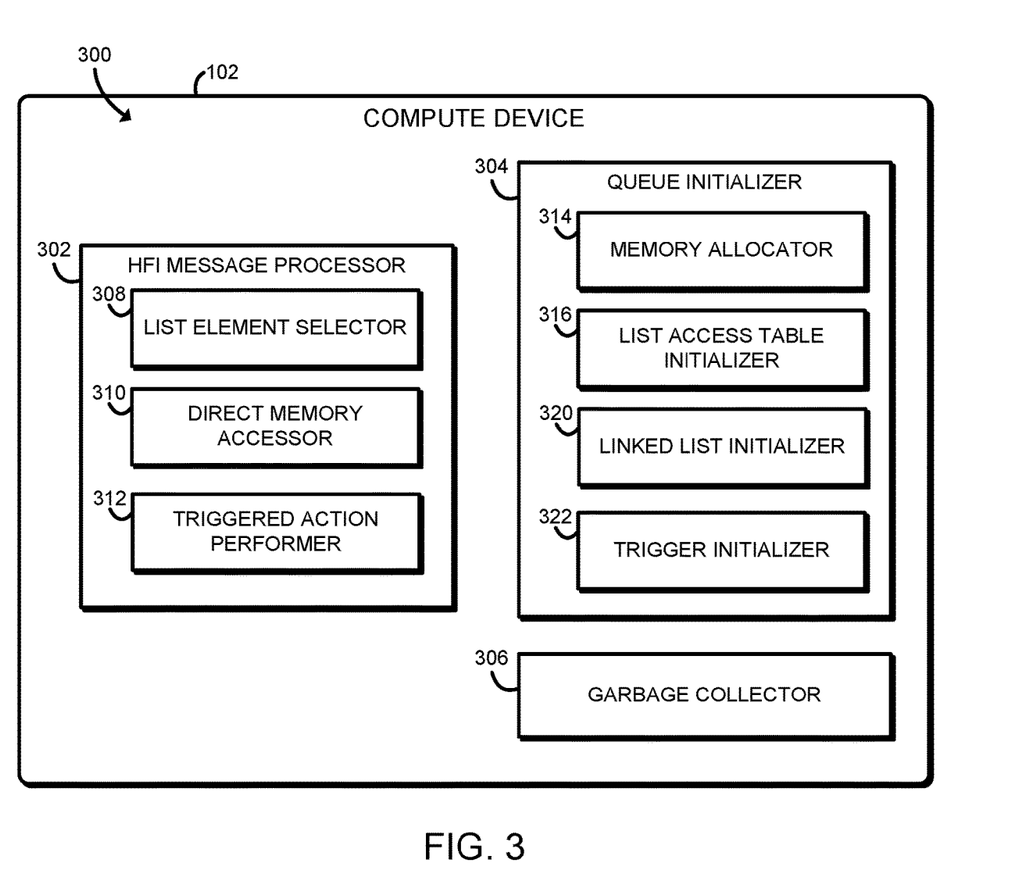
FIG. 3 is a block diagram of at least one embodiment of an environment that may be established by the compute device of FIG. 1.

Referring now to FIG. 3, in use, the compute device 102 may establish an environment 300. The illustrative environment 300 includes a host fabric interface (HFI) message processor 302, a queue initializer 304, and a garbage collector 306. The various components of the environment 300 may be embodied as hardware, firmware, software, or a combination thereof. As such, in some embodiments, one or more of the components of the environment 300 may be embodied as circuitry or collection of electrical devices (e.g., an HFI message processor circuit 302, a queue initializer circuit 304, a garbage collector circuit 306, etc.). It should be appreciated that, in such embodiments the HFI message processor circuit 302, the queue initializer circuit 304, the garbage collector circuit 306, etc. may form a portion of one or more of the processor 202, the I/O subsystem 206, the host fabric interface 210, and/or other components of the compute device 102. Additionally, in some embodiments, one or more of the illustrative components may form a portion of another component and/or one or more of the illustrative components may be independent of one another. Further, in some embodiments, one or more of the components of the environment 300 may be embodied as virtualized hardware components or emulated architecture, which may be established and maintained by the processor 202 or other components of the compute device 102.

The HFI message processor 302 is configured to process messages received by the host fabric interface 210. The HFI message processor 302 includes a list element selector 308, a direct memory accessor 310, and a triggered action performer 312. A message received by the host fabric interface 210 may include one or more parameters that the HFI message processor 302 may use in order to process the message (such as a queue operation type, queue element data, matching bits, etc.). In the illustrative embodiment, the HFI message processor 302 may process a message by first accessing an entry in a list access table based on a parameter of the received message. The entry in the list access table may point to (or otherwise provide an indication of a location of) a linked list of list elements maintained by the host fabric interface 210. Each list element points to (or otherwise provides an indication of) a corresponding memory location in the memory 204. In some embodiments, the list access table includes an entry to a queue list (which includes, for each element of the queue, a list element pointing to a memory location with the corresponding queue element data) and an entry to a free list (which includes one or more list elements pointing to free memory locations). In such embodiments, the HFI message processor 302 may select the first list element in the linked list with the list element selector 308. In other embodiments, the list access table may include an entry to a merged queue-free list. The merged queue-free list includes both a list element pointing to a memory location with queue element data for each element in the queue and one or more list elements pointing to free memory locations. The list elements in the merged queue-free list can be distinguished through the use of matching bits. The message being processed by the HFI message processor 302 may include matching bits, and the list element selector 308 may traverse the linked list in order, looking for a list element that has matching bits corresponding to those in the message. In such embodiments, the list element selector 308 may select the first list element that has matching bits that match those of the message. Of course, in some embodiments, the HFI message processor 302 may be able to process messages both with and without matching bits, such as by having a linked list associated with an entry in the list access table that does not use matching and a linked list associated with another entry in the list access table that does use matching. In the illustrative embodiment, the list element selector 308 removes a list element from the list when selecting the list element. In some embodiments, the list element selector 308 may allow the list element to remain as part of the list after selecting the list element.

After a list element has been selected, the direct memory accessor 310 may access the memory location associated with the list element. Depending on the parameters of the message, the HFI message processor 302 may write data to the memory location (i.e., data included in the message) or may read data from the memory location in the memory 204 and send it back to the remote compute device 102 which sent the message. It should be appreciated that the direct memory accessor 310 may read from and write to the memory 204 without involving the processor 202.

In some cases, a list element may have a trigger associated with it to perform a triggered action upon a certain condition being met, such as the memory associated with the list element being accessed a certain number of times (e.g., at least once). If so, the HFI message processor 302 adds the triggered action to a list of triggered actions to be performed. The triggered action performer 312 may then perform the triggered actions on the list. The HFI message processor 302 may be capable of triggering several types of actions, such as reading data, writing data, or appending a list element to a list (either a list that employs matching or a list that does not employ matching). It should be appreciated that, in some embodiments, processing the triggered actions by the triggered action performer 312 may be performed asynchronously from the rest of the message processing. For example, the triggered action performer 312 may be embodied as separate hardware from the hardware that performs other aspects of the message processing, such as selecting the list item and accessing the memory locations. In some embodiments, the HFI message processor 302 may be configured to reset a trigger after it is triggered, which may include resetting a counter indicating the number of times the memory location associated with a list has been accessed.

The queue initializer 304 is configured to initialize the queue that is to be accessed by remote compute devices 102. The queue initializer includes a memory allocator 314, a list access table initializer 316, a linked list initializer 320, and a trigger initializer 322. The memory allocator 314 is configured to determine a desired maximum queue length and a desired queue element length and allocate the requisite amount of memory in the memory 204. The list access table initializer 316 is configured to initialize the list access table in the host fabric interface 210 and the linked list initializer 320 is configured to initialize the linked lists that the entries in the list access table point to, such as by initializing a list element for each memory location associated with each possible queue element and initializing a linked list of the free list elements.

The garbage collector 306 is configured to perform garbage collection when necessary in certain embodiments. It should be appreciated that, as explained above and discussed below in more detail, when data is read from a queue, a list element is removed from the queue. In some embodiments, the list element may automatically be added to a list of free list elements by a triggered action. However, in other embodiments, the host fabric interface 210 may not be capable of resetting triggers without instruction from the compute device 102, and adding a list element to the list of free list elements without a trigger may be undesirable. In such embodiments, the garbage collector 306 may reset the trigger associated with a list element and append the list element to the free list.

Figure 4:
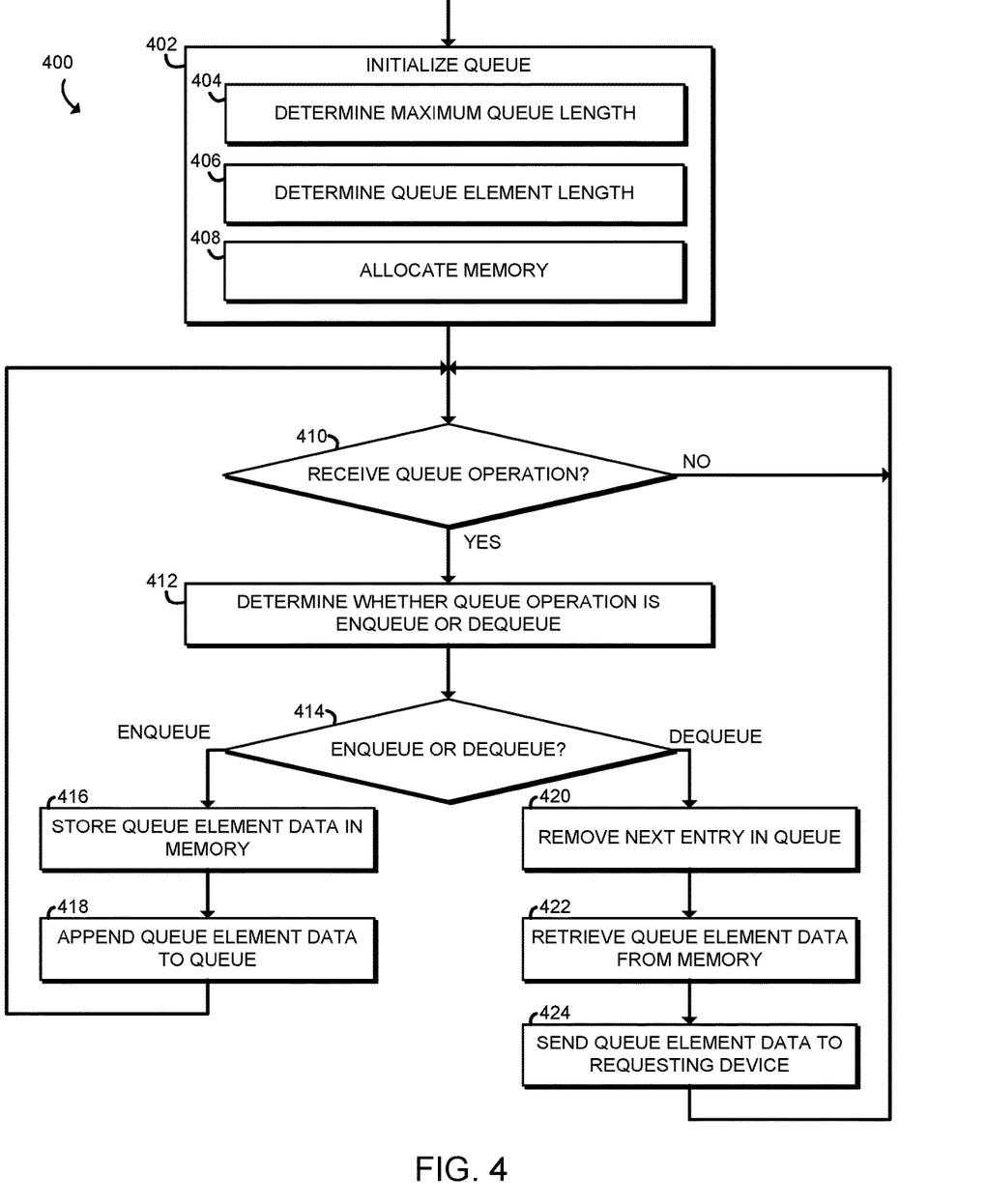
FIG. 4 is a simplified flow diagram of at least one embodiment of a method for accessing a queue by a remote compute device that may be executed by the compute device of FIG. 1.

Referring now to FIG. 4, in use, the compute device 102 may execute a method 400 for managing a queue. The method 400 begins in block 402, in which the compute device 102 initializes the queue. The compute device 102 may determine a maximum queue length in block 404 and determine a queue element length in block 406. In some embodiments, the queue may have more than one permitted element length, and, in such embodiments, the compute device 102 would determine each permitted element length in block 406. The compute device 102 then allocates a block of the memory 204 in block 408. Of course, it should be appreciated that the compute device 102 may allocate additional memory if necessary at a later time, such as if the amount of allocated memory available falls below a certain threshold.

In block 410, the compute device 102 determines whether the host fabric interface 210 has received a queue operation. If not, the method 400 loops back to block 410 in which the compute device 210 continues to monitor for queue operations. If the host fabric interface 210 has received a message that includes a queue operation, the method 400 proceeds to block 412, in which the compute device 102 determines whether the queue operation is an enqueue or a dequeue based on a parameter of the message. In block 414, if the queue operation is an enqueue, the method 400 proceeds to block 416.

In block 416, the host fabric interface 210 stores the queue element data from the queue operation in memory 204. The host fabric interface 210 appends the queue element data to the end of the queue in block 418. The method 400 then loops back to block 410, in which the compute device 102 continues to monitor for queue operations.

Referring back to block 414, if the queue operation is a dequeue, the method 400 proceeds to block 420, in which the host fabric interface 210 removes the next entry in the queue in block 420 and retrieves the queue element data from the memory in block 422. The host fabric interface 210 sends the queue element data to the compute device 102 which sent the queue operation in block 424. The method 400 then loops back to block 410, in which the compute device 102 continues to monitor for queue operations.

Figure 5:
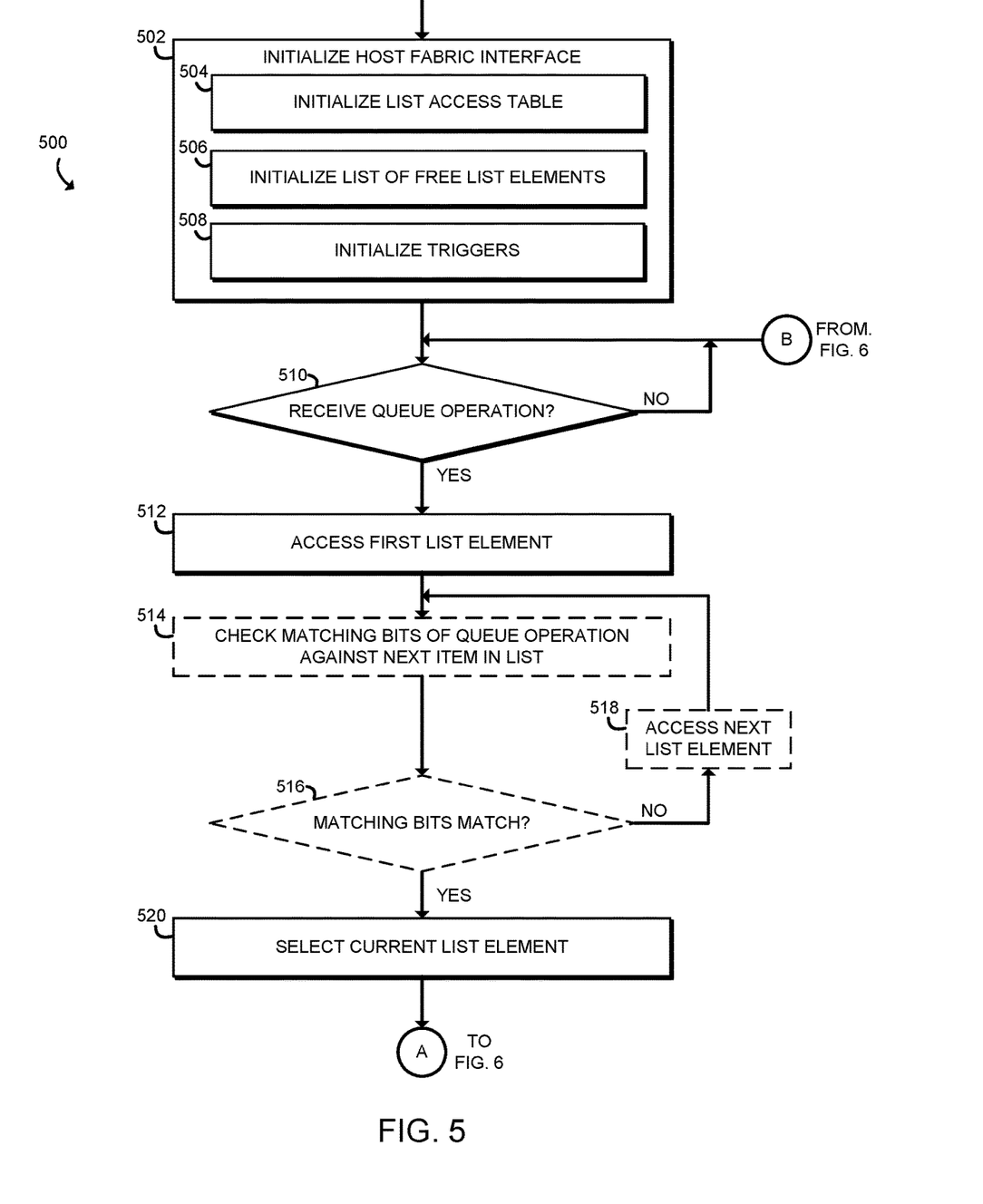
FIGS. 5 & 6 are a simplified flow diagram of at least one embodiment of a method for accessing a queue by a remote compute device that may be executed by the compute device of FIG. 1.

Referring now to FIG. 5, in use, the compute device 102 may execute a method 500 for managing a queue using linked lists stored in the host fabric interface 210. The method 500 begins in block 502, in which the compute device 102 initializes the host fabric interface 210. The compute device 102 initializes the list access table in block 504, initializes a list of free list elements (i.e., list elements with a pointer or other indication of a memory location that is free) in block 506, and initializes triggers associated with list elements in block 508. In embodiments in which queue elements are permitted to have more than one possible size, the compute device 102 initializes free list elements for each permitted size with matching bits associated with the size. When appending a queue element to the queue, an enqueue operation may select a free list element with the proper size using the corresponding matching bits.

In block 510, if the host fabric interface 210 has not received a queue operation, the method 500 loops back to block 510, in which the compute device 102 continues to monitor for queue operations. If the host fabric interface 210 has received a message that includes a queue operation, the method 500 proceeds to block 512, in which the host fabric interface 210 accesses the first list element of a linked list associated with an entry in the list access table referenced by the queue operation. In embodiments which do not use matching lists, the linked list associated with the entry referenced by the queue operation may be a queue list or a free list, and the first list element is subsequently used later in the method 500 (e.g., see blocks 520 and 522). In embodiments which do use matching lists, the linked list associated with the entry referenced by the queue operation is a merged queue-free list, and the host fabric interface 210 checks the matching bits of the queue operation against the matching bits of next item in the list (i.e., the first element for the first time through the loop) in block 514. For example, a list element may include enqueue matching bits for use in an enqueue operation or dequeue matching bits for use in a dequeue operation, and a queue operation would include either enqueue matching bits or dequeue matching bits depending on the queue operation to be performed. In block 516, if the matching bits do not match, the host fabric interface 210 accesses the next list element in block 518 and loops back to block 514 to check the matching bits of the next list element. If the matching bits do match, the method 500 proceeds to block 520, in which the host fabric interface 210 selects the current list element.

Figure 6:
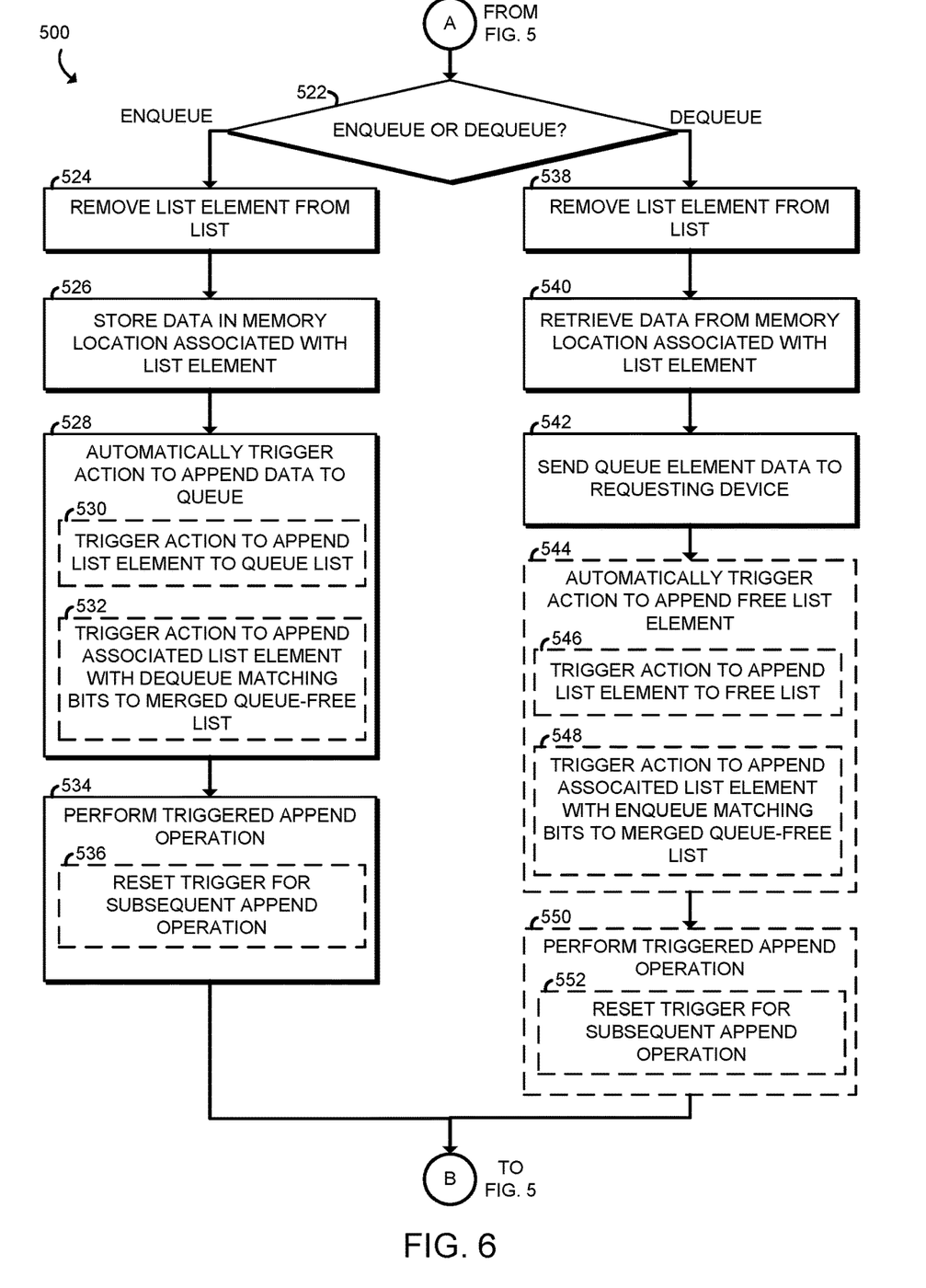

Subsequently in block 522 of FIG. 6, the compute device 102 determines whether the queue operation was an enqueue or dequeue operation. If the queue operation is an enqueue, the method 500 proceeds to block 524. In block 524, the host fabric interface 210 removes the selected list element from the list. In block 526, the host fabric interface 210 stores the queue element data in the memory location associated with the selected list element.

In block 528, the host fabric interface 210 automatically triggers an action to append the data to the queue. In some embodiments, such as ones which do not employ a matching list, the host fabric interface 210 may trigger an action to append the selected list element to the queue list (which is different from the free list which the selected list item was previously part of) in block 530. In other embodiments, such as ones which employ a matching list, the host fabric interface 210 may append a list element with dequeue matching bits and with an indication of the same memory location as the selected list element to a merged queue-free list (which is the same as the list which the selected list item was previously part of) in block 532. As discussed above, triggering an action does not actually perform that action, but only adds it to a list of actions to be performed.

In block 534, the host fabric interface 210 performs the triggered append operation. In some embodiments, the host fabric interface 210 may automatically reset the trigger associated with the selected list element so that the trigger can be fired again for a subsequent append operation in block 536. The method 500 then loops back to block 510 in FIG. 5, in which the compute device 102 continues to monitor for queue operations.

Referring back to block 522, if the queue operation is a dequeue, the method 500 proceeds to block 538, in which host fabric interface 210 removes the selected list element from the list. In block 540, the host fabric interface 210 retrieves the queue element data from the memory location associated with the selected list element. The host fabric interface 210 then sends the queue element data to the requesting compute device 102 in block 542.

In block 544, the host fabric interface 210 automatically triggers an action to append a free list element associated with the free memory location. In some embodiments, such as ones which do not employ a matching list, the host fabric interface 210 may trigger an action to append the selected list element to a free list (which is different from the queue list which the selected list item was previously part of) in block 546. In other embodiments, such as ones which employ a matching list, the host fabric interface 210 may append a list element with enqueue matching bits and with an indication of the same memory location as the selected list element to the merged queue-free list (which is the same as the list which the selected list item was previously part of) in block 548.

In block 550, the host fabric interface 210 performs the triggered append operation. In some embodiments, the host fabric interface 210 may automatically reset the trigger associated with the selected list element so that the trigger can be fired again for a subsequent append operation in block 552. The method 500 then loops back to block 510 in FIG. 5, in which the compute device 102 continues to monitor for queue operations.

Figure 7:
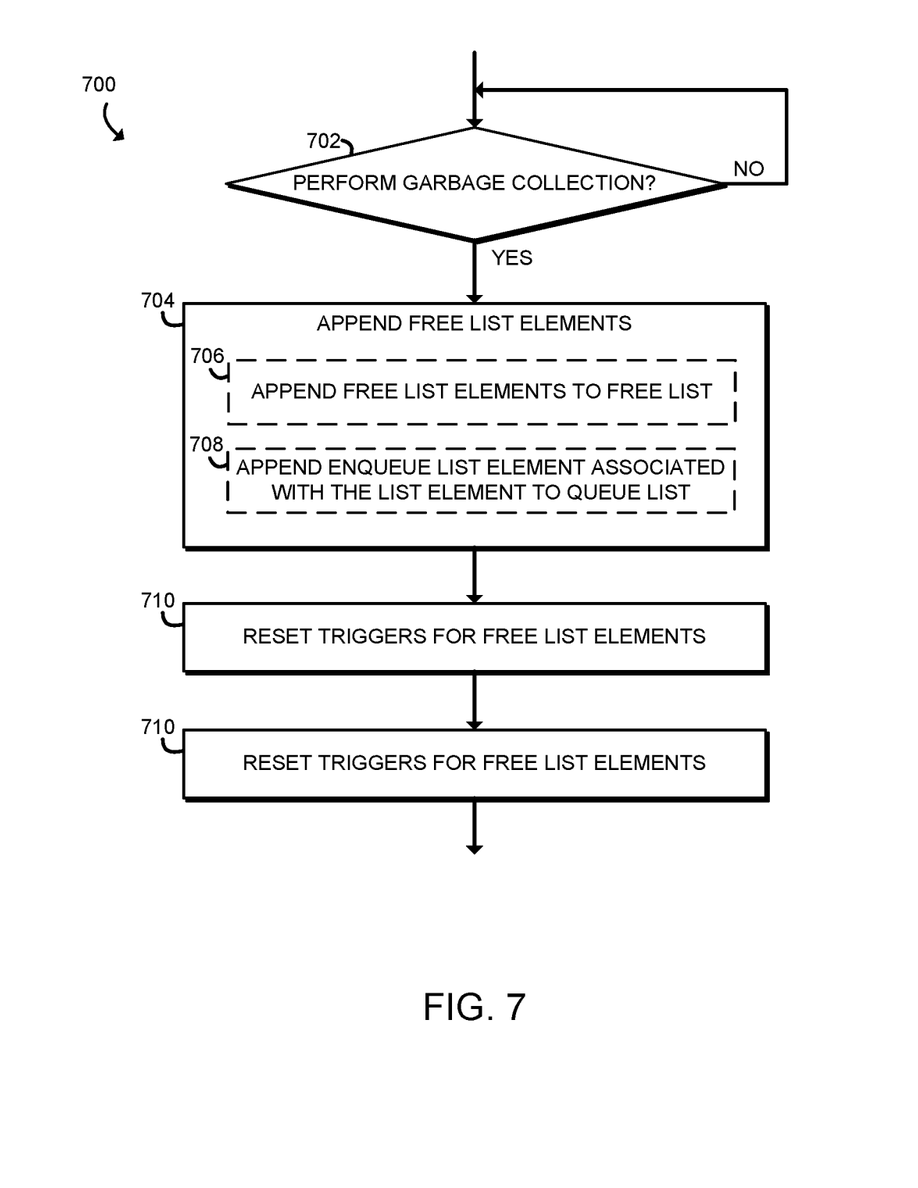
FIG. 7 is a simplified flow diagram of at least one embodiment of a method for garbage collection that may be executed by the compute device of FIG. 1.

Referring now to FIG. 7, in use, the compute device 102 may execute a method 700 for performing garbage collection. The method 700 begins in block 702, in which, if the compute device 102 is not to perform garbage collection, the method 700 loops back to block 702. If the compute device 102 is to perform garbage collection, the 700 proceeds to block 704. The compute device 102 may perform garbage collection periodically, continuously, continually, when so requested, or when a certain condition is met, such as a certain number of list elements that have been freed but not added to the free list.

In block 704, the method 700 appends the free list elements to the free list. In some embodiments, such as ones which do not employ a matching list, the compute device 102 append all of the free list elements to a free list, which is different from the queue list, in block 706. In other embodiments, such as ones which employ a matching list, the compute device 102 may append each free list element with enqueue matching bits to a merged queue-free list in block 548.

It should also be appreciated that, in some embodiments, the compute device 102 may manage a data structure other than a queue. For example, the compute device 102 may manage a stack data structure. Of course, some modifications of the approach described above would be required, such as prepending data to the beginning of the stack list when an element is added (instead of appending data to the end of the queue list, as described above).

EXAMPLES

Illustrative examples of the devices, systems, and methods disclosed herein are provided below. An embodiment of the devices, systems, and methods may include any one or more, and any combination of, the examples described below.

Example 1 includes a compute device for managing a queue, the compute device comprising a processor; a memory having a plurality of instructions stored therein that, when executed by the processor, causes the compute device to initialize the queue; and a host fabric interface different from the processor to receive an enqueue operation from a first remote compute device, wherein the enqueue operation comprises queue element data; enqueue, in response to receipt of the enqueue operation, the queue element data in the queue; receive a dequeue operation from a second remote compute device; dequeue, in response to receipt of the dequeue operation, the queue element data from the queue; and send the queue element data to the second remote compute device.

Example 2 includes the subject matter of Example 1, and wherein to enqueue the queue element data in the queue comprises to store the queue element data in the memory with use of direct memory access.

Example 3 includes the subject matter of any of Examples 1 and 2, and wherein the first compute device is different from the second compute device.

Example 4 includes the subject matter of any of Examples 1-3, and wherein the first compute device is the second compute device.

Example 5 includes the subject matter of any of Examples 1-4, and wherein to enqueue, in response to the enqueue operation, the queue element data in the queue comprises to select a list element at the front of a free list, wherein the list element comprises an indication of a memory location; remove the list element from the free list; store the queue element data in the memory location; trigger an append operation to append the list element to a queue list; and perform the append operation to append the list element to the queue list, and wherein to dequeue, in response to the dequeue operation, the queue element data from the queue comprises to select the list element at the front of the queue list; remove the list element from the queue list; and retrieve, from the memory location, the queue element data.

Example 6 includes the subject matter of any of Examples 1-5, and wherein to dequeue the queue element data from the queue further comprises to trigger an append operation to append the list element to the free list; and perform the append operation to append the list element to the free list.

Example 7 includes the subject matter of any of Examples 1-6, and wherein to trigger the append operation to append the list element to the queue list comprises to automatically reset, in response to the enqueue operation, a trigger for the append operation to append the list element to the queue list upon a subsequent removal of the list element from the free list; and wherein to trigger the append operation to append the list element to the free list comprises to automatically reset, in response to the dequeue operation, a trigger for the append operation to append the list element to the free list upon a subsequent removal of the list element from the queue list.

Example 8 includes the subject matter of any of Examples 1-7, and wherein the plurality of instruction further causes the compute device to perform garbage collection on the list element, wherein to perform garbage collection on the list element comprises to append the list element to the free list; and reset a trigger for the append operation to append the list element to the queue list upon a subsequent removal of the list element from the free list.

Example 9 includes the subject matter of any of Examples 1-8, and wherein to enqueue, in response to the enqueue operation, the queue element data in the queue comprises to traverse a merged queue-free list for a first list element, wherein the first list element comprises a plurality of enqueue matching bits that match a corresponding plurality of enqueue matching bits of the enqueue operation, wherein the first list element comprises an indication of a memory location; remove the first list element from the list; store the queue element data in the memory location; trigger an append operation to append a second list element, wherein the second list element comprises the indication of the memory location and a plurality of dequeue matching bits; and perform the append operation to append the second list element to the merged queue-free list, and wherein to dequeue, in response to the dequeue operation, the queue element data from the queue comprises to traverse the merged queue-free list for the second list element, wherein the plurality of dequeue matching bits of the second list element match a corresponding plurality of dequeue matching bits of the dequeue operation; remove the second list element from the merged queue-free list; and retrieve, from the memory location, the queue element data.

Example 10 includes the subject matter of any of Examples 1-9, and wherein to dequeue the queue element data from the queue further comprises to trigger an append operation to append the first list element to the merged queue-free list; and perform the append operation to append the first list element to the merged queue-free list.

Example 11 includes the subject matter of any of Examples 1-10, and wherein to trigger the append operation to append the second list element to the merged queue-free list comprises to automatically reset, in response to the enqueue operation, a trigger for the append operation to append the second list element to the merged queue-free list upon a subsequent removal of the first list element from the merged queue-free list; and wherein to trigger the append operation to append the first list element to the merged queue-free list comprises to automatically reset, in response to the dequeue operation, a trigger for the append operation to append the first list element to the merged queue-free list upon a subsequent removal of the second list element from the merged queue-free list.

Example 12 includes the subject matter of any of Examples 1-11, and wherein the plurality of instructions further causes the compute device to perform garbage collection on the first list element, wherein to perform garbage collection on the first list element comprises to append the first list element to the merged queue-free list; and reset a trigger for the append operation to append the second list element to the merged queue-free list upon a subsequent removal of the first list element from the merged queue-free list.

Example 13 includes the subject matter of any of Examples 1-12, and wherein the host fabric interface is further to receive an additional enqueue operation from the processor, wherein the additional enqueue operation comprises additional queue element data; and enqueue, in response to receipt of the additional enqueue operation, the additional queue element data in the queue.

Example 14 includes the subject matter of any of Examples 1-13, and wherein the host fabric interface is further to receive an additional enqueue operation from the first remote compute device, wherein the additional enqueue operation comprises additional queue element data; enqueue, in response to receipt of the additional enqueue operation, the additional queue element data in the queue; receive an additional dequeue operation from the processor; dequeue, in response to receipt of the additional dequeue operation, the additional queue element data from the queue; and send the additional queue element data to the processor.

Example 15 includes the subject matter of any of Examples 1-14, and wherein the host fabric interface is in its own package separate from the processor.

Example 16 includes the subject matter of any of Examples 1-15, and wherein the host fabric interface is in a multi-chip package with the processor or is in a system-on-a-chip with the processor.

Example 17 includes a method for managing a queue on a compute device, the method comprising initializing, by the compute device, the queue; receiving, by a host fabric interface of the compute device different from a processor of the compute device, an enqueue operation from a first remote compute device, wherein the enqueue operation comprises queue element data; enqueuing, by the host fabric interface and in response to receipt of the enqueue operation, the queue element data in the queue; receiving, by the host fabric interface, a dequeue operation from a second remote compute device; dequeuing, by the host fabric interface and in response to receipt of the dequeue operation, the queue element data from the queue; sending, by the host fabric interface, the queue element data to the second remote compute device.

Example 18 includes the subject matter of Example 17, and wherein enqueuing the queue element data in the queue comprises storing the queue element data in a memory of the compute device with use of direct memory access.

Example 19 includes the subject matter of any of Examples 17 and 18, and wherein the first compute device is different from the second compute device.

Example 20 includes the subject matter of any of Examples 17-19, and wherein the first compute device is the second compute device.

Example 21 includes the subject matter of any of Examples 17-20, and wherein enqueuing, by the host fabric interface and in response to the enqueue operation, the queue element data in the queue comprises selecting, by the host fabric interface, a list element at the front of a free list, wherein the list element comprises an indication of a memory location; removing, by the host fabric interface, the list element from the free list; storing, by the host fabric interface, the queue element data in the memory location; triggering, by the host fabric interface, an append operation to append the list element to a queue list; and performing, by the host fabric interface, the append operation to append the list element to the queue list, and wherein dequeuing, by the host fabric interface and in response to the dequeue operation, the queue element data from the queue comprises selecting, by the host fabric interface, the list element at the front of the queue list; removing, by the host fabric interface, the list element from the queue list; and retrieving, by the host fabric interface and from the memory location, the queue element data.

Example 22 includes the subject matter of any of Examples 17-21, and wherein dequeuing the queue element data from the queue further comprises triggering, by the host fabric interface, an append operation to append the list element to the free list; and performing, by the host fabric interface, the append operation to append the list element to the free list.

Example 23 includes the subject matter of any of Examples 17-22, and wherein triggering, by the host fabric interface, the append operation to append the list element to the queue list comprises automatically resetting, by the host fabric interface and in response to the enqueue operation, a trigger for the append operation to append the list element to the queue list upon a subsequent removal of the list element from the free list; and wherein triggering, by the host fabric interface, the append operation to append the list element to the free list comprises automatically resetting, by the host fabric interface and in response to the dequeue operation, a trigger for the append operation to append the list element to the free list upon a subsequent removal of the list element from the queue list.

Example 24 includes the subject matter of any of Examples 17-23, and further including performing garbage collection on the list element, wherein performing garbage collection on the list element comprises appending, by the compute device, the list element to the free list; and resetting, by the compute device, a trigger for the append operation to append the list element to the queue list upon a subsequent removal of the list element from the free list.

Example 25 includes the subject matter of any of Examples 17-24, and wherein enqueuing, by the host fabric interface and in response to the enqueue operation, the queue element data in the queue comprises traversing, by the host fabric interface, a merged queue-free list for a first list element, wherein the first list element comprises a plurality of enqueue matching bits that match a corresponding plurality of enqueue matching bits of the enqueue operation, wherein the first list element comprises an indication of a memory location; removing, by the host fabric interface, the first list element from the list; storing, by the host fabric interface, the queue element data in the memory location; triggering, by the host fabric interface, an append operation to append a second list element, wherein the second list element comprises the indication of the memory location and a plurality of dequeue matching bits; and performing, by the host fabric interface, the append operation to append the second list element to the merged queue-free list, and wherein dequeuing, by the host fabric interface and in response to the dequeue operation, the queue element data from the queue comprises traversing, by the host fabric interface, the merged queue-free list for the second list element, wherein the plurality of dequeue matching bits of the second list element match a corresponding plurality of dequeue matching bits of the dequeue operation; removing, by the host fabric interface, the second list element from the merged queue-free list; and retrieving, by the host fabric interface and from the memory location, the queue element data.

Example 26 includes the subject matter of any of Examples 17-25, and wherein dequeuing the queue element data from the queue further comprises triggering, by the host fabric interface, an append operation to append the first list element to the merged queue-free list; and performing, by the host fabric interface, the append operation to append the first list element to the merged queue-free list.

Example 27 includes the subject matter of any of Examples 17-26, and wherein triggering, by the host fabric interface, the append operation to append the second list element to the merged queue-free list comprises automatically resetting, by the host fabric interface and in response to the enqueue operation, a trigger for the append operation to append the second list element to the merged queue-free list upon a subsequent removal of the first list element from the merged queue-free list; and wherein triggering, by the host fabric interface, the append operation to append the first list element to the merged queue-free list comprises automatically resetting, by the host fabric interface and in response to the dequeue operation, a trigger for the append operation to append the first list element to the merged queue-free list upon a subsequent removal of the second list element from the merged queue-free list.

Example 28 includes the subject matter of any of Examples 17-27, and further including performing garbage collection on the first list element, wherein performing garbage collection on the first list element comprises appending, by the compute device, the first list element to the merged queue-free list; and resetting, by the compute device, a trigger for the append operation to append the second list element to the merged queue-free list upon a subsequent removal of the first list element from the merged queue-free list.

Example 29 includes the subject matter of any of Examples 17-28, and further including receiving an additional enqueue operation from the processor, wherein the additional enqueue operation comprises additional queue element data; and enqueuing, in response to receipt of the additional enqueue operation, the additional queue element data in the queue.

Example 30 includes the subject matter of any of Examples 17-29, and further including receiving an additional enqueue operation from the first remote compute device, wherein the additional enqueue operation comprises additional queue element data; enqueuing, in response to receipt of the additional enqueue operation, the additional queue element data in the queue; receiving an additional dequeue operation from the processor; dequeuing, in response to receipt of the additional dequeue operation, the additional queue element data from the queue; and sending the additional queue element data to the processor.

Example 31 includes the subject matter of any of Examples 17-30, and wherein the host fabric interface is in its own package separate from the processor.

Example 32 includes the subject matter of any of Examples 17-31, and wherein the host fabric interface is in a multi-chip package with the processor or is in a system-on-a-chip with the processor.

Example 33 includes one or more computer-readable media comprising a plurality of instructions stored thereon that, when executed, causes a compute device to perform the method of any of Examples 18-28.

Example 34 includes a compute device for managing a queue, the compute device comprising means for initializing the queue; a host fabric interface different from a processor of the compute device to receive an enqueue operation from a first remote compute device, wherein the enqueue operation comprises queue element data; means for enqueuing, by the host fabric interface and in response to receipt of the enqueue operation, the queue element data in the queue, wherein the host fabric interface is further to receive a dequeue operation from a second remote compute device, further comprising means for dequeuing, by the host fabric interface and in response to receipt of the dequeue operation, the queue element data from the queue, wherein the host fabric interface is further to send the queue element data to the second remote compute device.

Example 35 includes the subject matter of Example 34, and wherein the means for enqueuing the queue element data in the queue comprises means for storing the queue element data in a memory of the compute device with use of direct memory access.

Example 36 includes the subject matter of any of Examples 34 and 35, and wherein the first compute device is different from the second compute device.

Example 37 includes the subject matter of any of Examples 34-36, and wherein the first compute device is the second compute device.

Example 38 includes the subject matter of any of Examples 34-37, and wherein the means for enqueuing, by the host fabric interface and in response to the enqueue operation, the queue element data in the queue comprises means for selecting, by the host fabric interface, a list element at the front of a free list, wherein the list element comprises an indication of a memory location; means for removing, by the host fabric interface, the list element from the free list; means for storing, by the host fabric interface, the queue element data in the memory location; means for triggering, by the host fabric interface, an append operation to append the list element to a queue list; and means for performing, by the host fabric interface, the append operation to append the list element to the queue list, and wherein the means for dequeuing, by the host fabric interface and in response to the dequeue operation, the queue element data from the queue comprises means for selecting, by the host fabric interface, the list element at the front of the queue list; means for removing, by the host fabric interface, the list element from the queue list; and means for retrieving, by the host fabric interface and from the memory location, the queue element data.

Example 39 includes the subject matter of any of Examples 34-38, and wherein the means for dequeuing the queue element data from the queue further comprises means for triggering, by the host fabric interface, an append operation to append the list element to the free list; and means for performing, by the host fabric interface, the append operation to append the list element to the free list.

Example 40 includes the subject matter of any of Examples 34-39, and wherein the means for triggering, by the host fabric interface, the append operation to append the list element to the queue list comprises automatically means for resetting, by the host fabric interface and in response to the enqueue operation, a trigger for the append operation to append the list element to the queue list upon a subsequent removal of the list element from the free list; and wherein the means for triggering, by the host fabric interface, the append operation to append the list element to the free list comprises automatically means for resetting, by the host fabric interface and in response to the dequeue operation, a trigger for the append operation to append the list element to the free list upon a subsequent removal of the list element from the queue list.

Example 41 includes the subject matter of any of Examples 34-40, and further including means for performing garbage collection on the list element, wherein the means for performing garbage collection on the list element comprises means for appending the list element to the free list; and means for resetting a trigger for the append operation to append the list element to the queue list upon a subsequent removal of the list element from the free list.

Example 42 includes the subject matter of any of Examples 34-41, and wherein the means for enqueuing, by the host fabric interface and in response to the enqueue operation, the queue element data in the queue comprises means for traversing, by the host fabric interface, a merged queue-free list for a first list element, wherein the first list element comprises a plurality of enqueue matching bits that match a corresponding plurality of enqueue matching bits of the enqueue operation, wherein the first list element comprises an indication of a memory location; means for removing, by the host fabric interface, the first list element from the list; means for storing, by the host fabric interface, the queue element data in the memory location; means for triggering, by the host fabric interface, an append operation to append a second list element, wherein the second list element comprises the indication of the memory location and a plurality of dequeue matching bits; and means for performing, by the host fabric interface, the append operation to append the second list element to the merged queue-free list, and wherein the means for dequeuing, by the host fabric interface and in response to the dequeue operation, the queue element data from the queue comprises means for traversing, by the host fabric interface, the merged queue-free list for the second list element, wherein the plurality of dequeue matching bits of the second list element match a corresponding plurality of dequeue matching bits of the dequeue operation; means for removing, by the host fabric interface, the second list element from the merged queue-free list; and means for retrieving, by the host fabric interface and from the memory location, the queue element data.

Example 43 includes the subject matter of any of Examples 34-42, and wherein the means for dequeuing the queue element data from the queue further comprises means for triggering, by the host fabric interface, an append operation to append the first list element to the merged queue-free list; and means for performing, by the host fabric interface, the append operation to append the first list element to the merged queue-free list.

Example 44 includes the subject matter of any of Examples 34-43, and wherein the means for triggering, by the host fabric interface, the append operation to append the second list element to the merged queue-free list comprises automatically means for resetting, by the host fabric interface and in response to the enqueue operation, a trigger for the append operation to append the second list element to the merged queue-free list upon a subsequent removal of the first list element from the merged queue-free list; and wherein the means for triggering, by the host fabric interface, the append operation to append the first list element to the merged queue-free list comprises automatically means for resetting, by the host fabric interface and in response to the dequeue operation, a trigger for the append operation to append the first list element to the merged queue-free list upon a subsequent removal of the second list element from the merged queue-free list.

Example 45 includes the subject matter of any of Examples 34-44, and further including means for performing garbage collection on the first list element, wherein the means for performing garbage collection on the first list element comprises means for appending the first list element to the merged queue-free list; and means for resetting a trigger for the append operation to append the second list element to the merged queue-free list upon a subsequent removal of the first list element from the merged queue-free list.

Example 46 includes the subject matter of any of Examples 34-45, and wherein the host fabric interface is further to receive an additional enqueue operation from the processor, wherein the additional enqueue operation comprises additional queue element data, further comprising means for enqueuing, in response to receipt of the additional enqueue operation, the additional queue element data in the queue.

Example 47 includes the subject matter of any of Examples 34-46, and wherein the host fabric interface is further to receive an additional enqueue operation from the first remote compute device, wherein the additional enqueue operation comprises additional queue element data, further comprising means for enqueuing, in response to receipt of the additional enqueue operation, the additional queue element data in the queue, wherein the host fabric interface is further to receive an additional dequeue operation from the processor, further comprising means for dequeuing, in response to receipt of the additional dequeue operation, the additional queue element data from the queue, wherein the host fabric interface is further to send the additional queue element data to the processor.

Example 48 includes the subject matter of any of Examples 34-47, and wherein the host fabric interface is in its own package separate from the processor.

Example 49 includes the subject matter of any of Examples 34-48, and wherein the host fabric interface is in a multi-chip package with the processor or is in a system-on-a-chip with the processor.

The invention claimed is:

1. A compute device for managing a queue, the compute device comprising:
 a processor;
 a memory, wherein the processor is to initialize the queue in the memory; and
 a host fabric interface different from the processor and the memory, the host fabric interface to:
  receive an enqueue operation from a first remote compute device, wherein the enqueue operation comprises queue element data;
  enqueue, in response to receipt of the enqueue operation, the queue element data in the queue in the memory;
  receive a dequeue operation from a second remote compute device;
  dequeue, in response to receipt of the dequeue operation, the queue element data from the queue in the memory;
  send the queue element data to the second remote compute device;
  receive an additional enqueue operation from the first remote compute device,
 wherein the additional enqueue operation comprises additional queue element data;
  enqueue, in response to receipt of the additional enqueue operation, the additional queue element data in the queue;
  receive an additional dequeue operation from the processor;
  dequeue, in response to receipt of the additional dequeue operation, the additional queue element data from the queue; and
  send the additional queue element data to the processor.

2. The compute device of claim 1, wherein to enqueue the queue element data in the queue comprises to store the queue element data in the memory with use of direct memory access.

3. The compute device of claim 1, wherein to enqueue, in response to the enqueue operation, the queue element data in the queue comprises:
 select a list element at a front of a free list, wherein the list element comprises an indication of a memory location;
 remove the list element from the free list;
 store the queue element data in the memory location;
 trigger an append operation to append the list element to a queue list; and
 perform the append operation to append the list element to the queue list, and wherein to dequeue, in response to the dequeue operation, the queue element data from the queue comprises:
 select a list element at a front of the queue list;
 remove the list element from the queue list; and
 retrieve, from the memory location, the queue element data.

4. The compute device of claim 3, wherein to dequeue the queue element data from the queue further comprises to:
 trigger an append operation to append the list element to the free list; and
 perform the append operation to append the list element to the free list.

5. The compute device of claim 4, wherein to trigger the append operation to append the list element to the queue list comprises to automatically reset, in response to the enqueue operation, a trigger for the append operation to append the list element to the queue list upon a subsequent removal of the list element from the free list; and
 wherein to trigger the append operation to append the list element to the free list comprises to automatically reset, in response to the dequeue operation, a trigger for the append operation to append the list element to the free list upon a subsequent removal of the list element from the queue list.

6. The compute device of claim 1, wherein to enqueue, in response to the enqueue operation, the queue element data in the queue comprises to:
 traverse a merged queue-free list for a first list element, wherein the first list element comprises a plurality of enqueue matching bits that match a corresponding plurality of enqueue matching bits of the enqueue operation, wherein the first list element comprises an indication of a memory location;
 remove the first list element from the list;
 store the queue element data in the memory location;
 trigger an append operation to append a second list element, wherein the second list element comprises the indication of the memory location and a plurality of dequeue matching bits; and
 perform the append operation to append the second list element to the merged queue-free list, and
 wherein to dequeue, in response to the dequeue operation, the queue element data from the queue comprises to:
 traverse the merged queue-free list for the second list element, wherein the plurality of dequeue matching bits of the second list element match a corresponding plurality of dequeue matching bits of the dequeue operation;
 remove the second list element from the merged queue-free list; and
 retrieve, from the memory location, the queue element data.

7. The compute device of claim 1, wherein the host fabric interface is further to:
 receive an additional enqueue operation from the processor, wherein the additional enqueue operation comprises additional queue element data; and
 enqueue, in response to receipt of the additional enqueue operation, the additional queue element data in the queue.

8. The compute device of claim 1, wherein the host fabric interface is in a package separate from the processor.

9. The compute device of claim 1, wherein the host fabric interface is in a multi-chip package with the processor or is in a system-on-a-chip with the processor.

10. A method for managing a queue on a compute device, the method comprising:
  initializing, by the compute device, the queue;
  receiving, by a host fabric interface of the compute device different from a processor of the compute device, an enqueue operation from a first remote compute device, wherein the enqueue operation comprises queue element data;
  enqueuing, by the host fabric interface and in response to receipt of the enqueue operation, the queue element data in the queue;
  receiving, by the host fabric interface, a dequeue operation from a second remote compute device;
  dequeuing, by the host fabric interface and in response to receipt of the dequeue operation, the queue element data from the queue;
  sending, by the host fabric interface, the queue element data to the second remote compute device;
  receiving, by the host fabric interface, an additional enqueue operation from the first remote compute device, wherein the additional enqueue operation comprises additional queue element data;
  enqueuing, by the host fabric interface, in response to receipt of the additional enqueue operation, the additional queue element data in the queue;
  receiving, by the host fabric interface, an additional dequeue operation from the processor;
  dequeuing, by the host fabric interface, in response to receipt of the additional dequeue operation, the additional queue element data from the queue; and
  sending, by the host fabric interface, the additional queue element data to the processor.

11. The method of claim 10, wherein enqueuing the queue element data in the queue comprises storing the queue element data in a memory accessible to the compute device with use of direct memory access.

12. The method of claim 10, wherein enqueuing, by the host fabric interface and in response to the enqueue operation, the queue element data in the queue comprises:
  selecting, by the host fabric interface, a list element at a front of a free list, wherein the list element comprises an indication of a memory location;
  removing, by the host fabric interface, the list element from the free list;
  storing, by the host fabric interface, the queue element data in the memory location;
  triggering, by the host fabric interface, an append operation to append the list element to a queue list; and
  performing, by the host fabric interface, the append operation to append the list element to the queue list, and
wherein dequeuing, by the host fabric interface and in response to the dequeue operation, the queue element data from the queue comprises:
  selecting, by the host fabric interface, a list element at a front of the queue list;
  removing, by the host fabric interface, the list element from the queue list; and
  retrieving, by the host fabric interface and from the memory location, the queue element data.

13. The method of claim 12, wherein dequeuing the queue element data from the queue further comprises:
  triggering, by the host fabric interface, an append operation to append the list element to the free list; and
  performing, by the host fabric interface, the append operation to append the list element to the free list.

14. The method of claim 10, wherein enqueuing, by the host fabric interface and in response to the enqueue operation, the queue element data in the queue comprises:
  traversing, by the host fabric interface, a merged queue-free list for a first list element, wherein the first list element comprises a plurality of enqueue matching bits that match a corresponding plurality of enqueue matching bits of the enqueue operation, wherein the first list element comprises an indication of a memory location;
  removing, by the host fabric interface, the first list element from the list;
  storing, by the host fabric interface, the queue element data in the memory location;
  triggering, by the host fabric interface, an append operation to append a second list element, wherein the second list element comprises the indication of the memory location and a plurality of dequeue matching bits; and
  performing, by the host fabric interface, the append operation to append the second list element to the merged queue-free list, and
wherein dequeuing, by the host fabric interface and in response to the dequeue operation, the queue element data from the queue comprises:
  traversing, by the host fabric interface, the merged queue-free list for the second list element, wherein the plurality of dequeue matching bits of the second list element match a corresponding plurality of dequeue matching bits of the dequeue operation;
  removing, by the host fabric interface, the second list element from the merged queue-free list; and
  retrieving, by the host fabric interface and from the memory location, the queue element data.

15. The method of claim 14, wherein dequeuing the queue element data from the queue further comprises:
  triggering, by the host fabric interface, an append operation to append the first list element to the merged queue-free list; and
  performing, by the host fabric interface, the append operation to append the first list element to the merged queue-free list.

16. One or more non-transitory computer-readable media comprising a plurality of instructions stored thereon that, when executed, causes a compute device to:
  initialize a queue;
  receive, by a host fabric interface different from a processor of the compute device, an enqueue operation from a first remote compute device, wherein the enqueue operation comprises queue element data;
  enqueue, by the host fabric interface and in response to receipt of the enqueue operation, the queue element data in the queue;
  receive, by the host fabric interface, a dequeue operation from a second remote compute device;
  dequeue, by the host fabric interface and in response to receipt of the dequeue operation, the queue element data from the queue;
  send, by the host fabric interface, the queue element data to the second remote compute device;
  receive, by the host fabric interface, an additional enqueue operation from the first remote compute device, wherein the additional enqueue operation comprises additional queue element data;

enqueue, by the host fabric interface, in response to receipt of the additional enqueue operation, the additional queue element data in the queue;

receive, by the host fabric interface, an additional dequeue operation from the processor;

dequeue, by the host fabric interface, in response to receipt of the additional dequeue operation, the additional queue element data from the queue; and send, by the host fabric interface, the additional queue element data to the processor.

17. The one or more non-transitory computer-readable media of claim 16, wherein to enqueue the queue element data in the queue comprises to store the queue element data in a memory with use of direct memory access.

18. The one or more non-transitory computer-readable media of claim 16, wherein to enqueue, in response to the enqueue operation, the queue element data in the queue comprises to:

select a list element at a front of a free list, wherein the list element comprises an indication of a memory location;

remove the list element from the free list;

store the queue element data in the memory location;

trigger an append operation to append the list element to a queue list; and perform the append operation to append the list element to the queue list, and wherein to dequeue, in response to the dequeue operation, the queue element data from the queue comprises to:

select the list element at a front of the queue list;

remove the list element from the queue list; and retrieve, from the memory location, the queue element data.

19. The one or more non-transitory computer-readable media of claim 18, wherein to dequeue the queue element data from the queue further comprises to:

trigger an append operation to append the list element to the free list; and perform the append operation to append the list element to the free list.

20. The one or more non-transitory computer-readable media of claim 16, wherein to enqueue, in response to the enqueue operation, the queue element data in the queue comprises to:

traverse a merged queue-free list for a first list element, wherein the first list element comprises a plurality of enqueue matching bits that match a corresponding plurality of enqueue matching bits of the enqueue operation, wherein the first list element comprises an indication of a memory location;

remove the first list element from the list;

store the queue element data in the memory location;

trigger an append operation to append a second list element, wherein the second list element comprises the indication of the memory location and a plurality of dequeue matching bits; and perform the append operation to append the second list element to the merged queue-free list, and wherein to dequeue, in response to the dequeue operation, the queue element data from the queue comprises to:

traverse the merged queue-free list for the second list element, wherein the plurality of dequeue matching bits of the second list element match a corresponding plurality of dequeue matching bits of the dequeue operation;

remove the second list element from the merged queue-free list; and retrieve, from the memory location, the queue element data.

21. The one or more non-transitory computer-readable media of claim 20, wherein to dequeue the queue element data from the queue further comprises to:

trigger an append operation to append the first list element to the merged queue-free list; and perform the append operation to append the first list element to the merged queue-free list.

22. A compute device for managing a queue, the compute device comprising:

means for initializing the queue;

a host fabric interface different from a processor of the compute device to receive an enqueue operation from a first remote compute device, wherein the enqueue operation comprises queue element data;

means for enqueuing, by the host fabric interface and in response to receipt of the enqueue operation, the queue element data in the queue, wherein the host fabric interface is further to receive a dequeue operation from a second remote compute device, further comprising means for dequeuing, by the host fabric interface and in response to receipt of the dequeue operation, the queue element data from the queue, wherein the host fabric interface is further to send the queue element data to the second remote compute device, wherein the host fabric interface is to receive an additional enqueue operation from the first remote compute device, wherein the additional enqueue operation comprises additional queue element data, means for enqueuing, by the host fabric interface and in response to receipt of the additional enqueue operation, the additional queue element data in the queue;

wherein the host fabric interface is to receive an additional dequeue operation from the processor;

means for dequeuing, by the host fabric interface and in response to receipt of the additional dequeue operation, the additional queue element data from the queue; and means for sending, by the host fabric interface, the additional queue element data to the processor.

23. The compute device of claim 22, wherein the means for enqueuing, by the host fabric interface and in response to the enqueue operation, the queue element data in the queue comprises:

means for selecting, by the host fabric interface, a list element at a front of a free list, wherein the list element comprises an indication of a memory location;

means for removing, by the host fabric interface, the list element from the free list;

means for storing, by the host fabric interface, the queue element data in the memory location;

means for triggering, by the host fabric interface, an append operation to append the list element to a queue list; and means for performing, by the host fabric interface, the append operation to append the list element to the queue list, and wherein the means for dequeuing, by the host fabric interface and in response to the dequeue operation, the queue element data from the queue comprises:

means for selecting, by the host fabric interface, the list element at a front of the queue list;

means for removing, by the host fabric interface, the list element from the queue list; and means for retrieving, by the host fabric interface and from the memory location, the queue element data.

24. The compute device of claim 22, wherein the means for enqueuing, by the host fabric interface and in response to the enqueue operation, the queue element data in the queue comprises:
  means for traversing, by the host fabric interface, a merged queue-free list for a first list element, wherein the first list element comprises a plurality of enqueue matching bits that match a corresponding plurality of enqueue matching bits of the enqueue operation, wherein the first list element comprises an indication of a memory location;
  means for removing, by the host fabric interface, the first list element from the list;
  means for storing, by the host fabric interface, the queue element data in the memory location;
  means for triggering, by the host fabric interface, an append operation to append a second list element, wherein the second list element comprises the indication of the memory location and a plurality of dequeue matching bits; and
  means for performing, by the host fabric interface, the append operation to append the second list element to the merged queue-free list, and
  wherein the means for dequeuing, by the host fabric interface and in response to the dequeue operation, the queue element data from the queue comprises:
  means for traversing, by the host fabric interface, the merged queue-free list for the second list element, wherein the plurality of dequeue matching bits of the second list element match a corresponding plurality of dequeue matching bits of the dequeue operation;
  means for removing, by the host fabric interface, the second list element from the merged queue-free list; and
  means for retrieving, by the host fabric interface and from the memory location, the queue element data.

* * * * *